(12) United States Patent
Uenishi (10) Patent No.: US 11,099,527 B2
(45) Date of Patent: Aug. 24, 2021

(54) MACHINING ENVIRONMENT ESTIMATION DEVICE

(71) Applicant: FANUC Corporation, Yamanashi (JP)

(72) Inventor: Daisuke Uenishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/547,576

(22) Filed: Aug. 22, 2019

(65) Prior Publication Data
US 2020/0073344 A1 Mar. 5, 2020

(30) Foreign Application Priority Data
Aug. 31, 2018 (JP) .............................. JP2018-162451

(51) Int. Cl.
*G05B 13/02* (2006.01)
(52) U.S. Cl.
CPC ................................ *G05B 13/0265* (2013.01)
(58) Field of Classification Search
None
See application file for complete search history.

(56) References Cited

U.S. PATENT DOCUMENTS

| | | | |
|---|---|---|---|
| 2004/0030664 A1* | 2/2004 | Kotoulas | F16F 15/02 706/22 |
| 2008/0177403 A1 | 7/2008 | Masuya et al. | |
| 2016/0346956 A1 | 12/2016 | Takekawa et al. | |
| 2017/0060104 A1* | 3/2017 | Genma | G05B 13/0265 |
| 2017/0293862 A1 | 10/2017 | Kamiya et al. | |
| 2018/0164757 A1* | 6/2018 | Matsushima | G05B 13/027 |
| 2018/0307198 A1* | 10/2018 | Aizawa | G05B 19/402 |
| 2018/0341244 A1* | 11/2018 | Xu | G06N 20/00 |
| 2019/0101892 A1* | 4/2019 | Satou | G05B 19/4065 |
| 2019/0308297 A1 | 10/2019 | Frutiger | |
| 2020/0272122 A1* | 8/2020 | Oikawa | G05B 19/404 |
| 2020/0279158 A1* | 9/2020 | Tsunoda | G06N 3/08 |

(Continued)

FOREIGN PATENT DOCUMENTS

| | | |
|---|---|---|
| JP | H11129145 A | 5/1999 |
| JP | 2001179620 A | 7/2001 |
| JP | 200394291 A | 4/2003 |

(Continued)

*Primary Examiner* — Jennifer L Norton
(74) *Attorney, Agent, or Firm* — Hauptman Ham, LLP (57) ABSTRACT

A machining environment estimation device includes a data acquisition unit that acquires vibration time-series data which indicates a machining environment of the machine tool, machining conditions in carrying out machining for a workpiece in the machine tool, measurement data of a machined surface of a machining-finished workpiece, and machined surface evaluation data, a pre-processing unit that creates vibration data and machining condition data which serve as state data, and machined surface measurement data and machined surface evaluation data which serve as label data, and a learning unit that generates a learning model which learned (a) the machined surface measurement data and (b) a machined surface evaluation result of the machining-finished workpiece, with respect to (i) a vibration state and (ii) the machining conditions in the machining environment, based on the state data and the label data.

1 Claim, 7 Drawing Sheets

(56) References Cited

U.S. PATENT DOCUMENTS

| 2020/0394092 | A1* | 12/2020 | Satou | ............... | G06F 11/0766 |
| 2021/0031384 | A1* | 2/2021 | Hirose | ............... | G05B 19/19 |

FOREIGN PATENT DOCUMENTS

| JP | 2006-159299 A | 6/2006 |
| JP | 2008176559 A | 7/2008 |
| JP | 2016219756 A | 12/2016 |
| JP | 2017188030 A | 10/2017 |

* cited by examiner

| MAIN FREQUENCY COMPONENT | GUIDANCE |
|---|---|
| Fi(Hz) | THERE IS POSSIBILITY THAT VIBRATION OF FANS A OR B INSIDE CONTROL PANEL CAUSES DEFECT IN A MACHINED SURFACE |
| Fj(Hz) | THERE IS POSSIBILITY THAT VIBRATION OF MIST COLLECTOR A OF PERIPHERAL DEVICE CAUSES DEFECT IN A MACHINED SURFACE |
| Fk~Fl(Hz) | THERE IS POSSIBILITY THAT VIBRATION OF ROBOT A INSTALLED NEARBY OR MACHINE TOOLS A, B, AND C CAUSES DEFECT IN A MACHINED SURFACE |
| ... | ... |

MACHINING ENVIRONMENT ESTIMATION DEVICE

RELATED APPLICATIONS

The present application claims priority to Japanese Patent Application Number 2018-162451 filed Aug. 31, 2018, the disclosure of which is hereby incorporated by reference herein in its entirety.

BACKGROUND OF THE INVENTION

1. Field of the Invention

The present disclosure relates to a machining environment estimation device, and particularly, relates to a machining environment estimation device that measures a machining environment which affects high quality machining.

2. Description of the Related Art

In recent years, high quality machining for exterior components such as IT components and accessories is carried out using a machine tool such as machining centers (for example, see Japanese Patent Application Laid-Open No. 2006-159299). Tools made of a single crystal diamond, a polycrystalline diamond (PCD), and a cubic boron nitride (CBN) are used for the high quality machining. A fact is known as follows. When mirror surface machining is carried out using the tools, a machined surface quality is greatly affected by vibrations generated due to rotation or disturbance of a spindle. Therefore, the vibrations of the machine, which cause a defect in a machined surface, are measured using a vibration measurement device. A generation cause of the defect in the machined surface is identified, based on a correlation between respectively measured vibrations and machining conditions.

In the related art, it is considered that a main cause of the defect in the machined surface is the vibration resulting from the rotation of the spindle. However, beats are generated due to a combination between the vibration whose amplitude is small (for example, the vibration whose amplitude is equal to or smaller than $1/100$ of the amplitude of the rotational vibration of the spindle) and the rotational vibration of the spindle, thereby causing the defect in the machined surface in some cases. In addition, for example, machining in which the spindle does not rotate, such as spring neck machining, may also cause the defect in the machined surface. In order to solve this problem, a method has been introduced in which the vibration of the spindle is measured so as to identify a vibration source transmitting the vibration to a portion of the spindle.

However, these techniques in the related art have the following problems. That is, the machine tool generates not only the vibration caused by the rotation of the spindle but also various vibrations. For example, due to some causes, the vibration close to a frequency of the vibration caused by the rotation of the spindle and having a minute amplitude may be generated. In this case, for example, even if spectral analysis is performed using Fast Fourier Transform (FFT), it is difficult in practice to separately analyze the vibration caused by the rotation of the spindle and the disturbance vibration having the minute amplitude. That is, it is difficult to identify the generation cause of the small vibration which may affect a machining quality.

In addition, as described above, the vibration in the machine tool includes not only the vibration caused by the rotation of the spindle but also the vibration caused by an external environment. For example, a table (workpiece side) of the machine tool may be affected by an installation state of the machine tool or the vibration generated in a machine adjacent thereto. However, according to the method in the related art, it is difficult to distinguish the vibration caused by the spindle (tool side) and the vibration caused by the table (workpiece side). In addition, in the related art, after a defect occurs on a machined surface, the generation cause of vibration is pursued and dealt with. Therefore, it is necessary to inspect all machining-finished workpieces. In addition, in order to identify the generation cause of the vibration by analyzing the vibration, based on a state of the machined surface of the workpieces, it is necessary to employ a skilled person who is familiar with influence of the vibration on the machined surface. However, in an environment having no skilled person, it is difficult to identify the generation cause of vibration. Furthermore, a required machining quality varies depending on a type of the workpieces or a machining type. Therefore, if machining is carried out to maintain a constant quality for all of the workpieces or regardless of the machining type, the machining-finished workpiece or a machining-finished portion may be of excessively high quality.

Therefore, the present disclosure aims to provide a machining environment estimation device which can predict influence exerted by vibrations on machining in accordance with a required machining quality.

SUMMARY OF THE INVENTION

According to an embodiment of the present disclosure, three types of vibration data are measured for a spindle rotational vibration, a holder unit vibration, and a table unit vibration. The spindle rotational vibration is generated by the rotation of the spindle in a spindle unit of a machine tool. The holder unit vibration is generated in such a way that an external vibration is transmitted to a holder unit attached to the spindle unit through the inside of the spindle. The table unit vibration is caused by movement of a table, or is transmitted from the outside to the table. Spectral analysis (FFT analysis) is performed on the three measured types of the vibration data. Each frequency data obtained by performing the spectral analysis and machining conditions (spindle rotation speed, feedrate, and the number of blades) of the machine tool are used as input data in machine learning. In addition, data on a wavelength having great influence as an amplitude and data on whether or not a defect in a machined surface is present, which is obtained from a result of the spectral analysis performed on machined surface roughness are taught as label data in the machine learning. The machine learning is performed so as to identify a vibration source resulting in defect in a machined surface, based on the above-described input data and label data. A machining environment estimation device according to an embodiment of the present disclosure predicts the occurrence of the defect in the machined surface by using a result of the machine learning, based on the three types of the vibration data.

According to an aspect of the present disclosure, there is provided a machining environment estimation device for estimating influence exerted by vibrations on machining in a machine tool, the machining environment estimation device including: a data acquisition unit that acquires vibration time-series data of a holder attached to a spindle of the machine tool, vibration time-series data of the spindle in the machine tool, and vibration time-series data of a table in the machine tool that indicate a machining environment of the machine tool, machining conditions in carrying out machining for a workpiece in the machine tool, measurement data of a machined surface of a machining-finished workpiece obtained by the machining, and evaluation data of the machined surface; a pre-processing unit that creates vibration data and machining condition data which serve as state data, and machined surface measurement data and machined surface evaluation data which serve as label data, based on data acquired by the data acquisition unit; and a learning unit that generates a learning model which learned (a) the machined surface measurement data and (b) a machined surface evaluation result of the machining-finished workpiece, with respect to (i) a vibration state and (ii) the machining conditions in the machining environment, based on the state data and the label data.

According to another aspect of the present disclosure, there is provided a machining environment estimation device for estimating influence exerted by vibrations on machining in a machine tool, the machining environment estimation device including: a data acquisition unit that acquires vibration time-series data of a holder attached to a spindle of the machine tool, vibration time-series data of the spindle in the machine tool, and vibration time-series data of a table in the machine tool that indicate a machining environment of the machine tool, and machining conditions in carrying out machining for a workpiece in the machine tool; a pre-processing unit that creates vibration data and machining condition data which serve as state data, based on data acquired by the data acquisition unit; a learning model storage unit that stores a learned model in which machined surface measurement data and a machined surface evaluation result of a machining-finished workpiece have been learned for a vibration state and the machining conditions in the machining environment; and an estimation unit that estimates the machined surface measurement data and the machined surface evaluation of the machining-finished workpiece by using the learned model, based on the state data.

The vibration transmitted to the spindle unit during stoppage of the spindle is measured in the holder unit. In this manner, it is possible to determine a minute disturbance vibration. Therefore, a cause of the defect in the machined surface can be more precisely estimated. In addition, after the machine learning, whether or not there is the defect in the machined surface is determined, based on only a vibration frequency of the machine. Therefore, it is possible to predict the occurrence of the defect in the machined surface before an operation starts in a factory or before machining is carried out for the workpiece. In particular, in a heat radiation fan or a mist collector considered as a vibration source which causes the defect in the machined surface, the vibration tends to increase due to aging degradation or cutting fluid adhesion. Embodiments according to the present disclosure enable a user to predict the vibration source, based on a change in the vibration frequency.

BRIEF DESCRIPTION OF THE DRAWINGS

The above-described and other aspects of the present disclosure will be apparent from the following description of embodiments with reference to the accompanying drawings. In the drawings.

DETAILED DESCRIPTION OF THE PREFERRED EMBODIMENTS

Hereinafter, embodiments according to the present disclosure will be described with reference to the drawings.

Figure 1:
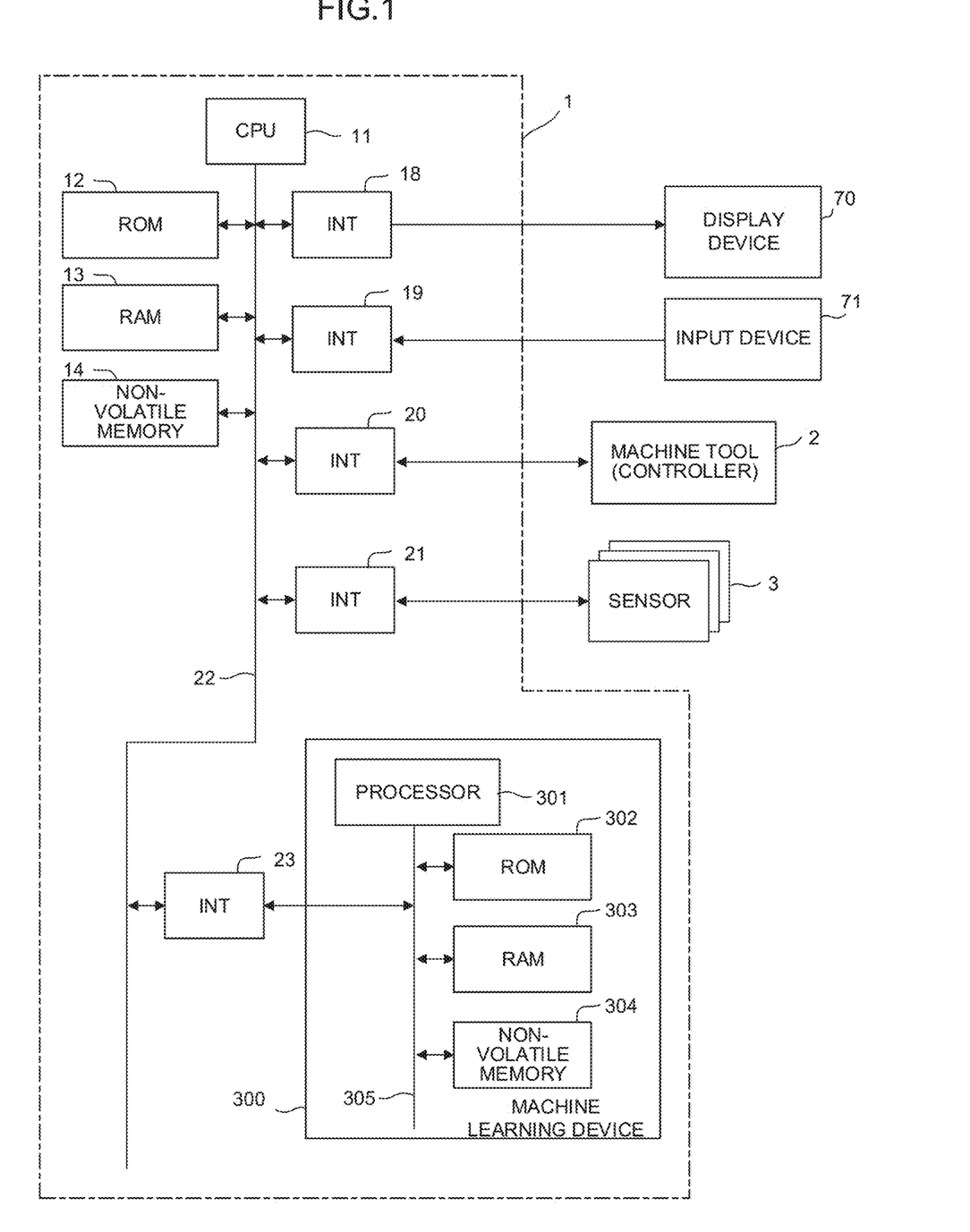
FIG. 1 is a schematic hardware configuration diagram of a machining environment estimation device according to an embodiment.

FIG. 1 is a schematic hardware configuration diagram illustrating a machining environment estimation device 1 according to an embodiment of the present disclosure. The machining environment estimation device 1 according to the present embodiment is implemented on a personal computer installed along with a controller which controls a machine tool 2. In addition, the machining environment estimation device 1 may be implemented on a computer such as a cell computer, a host computer, and a computer of a cloud server which are connected to the machine tool 2 via a network. FIG. 1 illustrates an example in a case where the machining environment estimation device 1 is mounted on the personal computer installed along with the controller which controls the machine tool 2.

A central processing unit (CPU) 11 included in the machining environment estimation device 1 according to the present embodiment is a processor which entirely controls the machining environment estimation device 1. The CPU 11 reads a system program stored in a read only memory (ROM) 12 via a bus 22. The CPU 11 controls the overall machining environment estimation device 1 in accordance with the system program. A random access memory (RAM) 13 stores temporary calculation data or display data to be displayed on a display device 70. The display data stored in the RAM 13 is output to the display device 70 via an interface 18. In addition, the RAM 13 also stores various types of data input by an operator via an input device 71.

For example, a non-volatile memory 14 is a static random access memory (SRAM) or a solid state drive (SSD) backed up by a battery (not illustrated). The non-volatile memory 14 holds a storage state even when power of the machining environment estimation device 1 is turned off. The non-volatile memory 14 stores data or a program which are input from the input device 71 via an interface 19. In addition, the non-volatile memory 14 stores data acquired from the machine tool 2 (via a universal serial bus (USB) device (not illustrated)) in an offline manner or in an online manner (via an interface 20). In addition, the non-volatile memory 14 stores machined surface measurement data of a machining-finished workpiece which is acquired in the online manner or in the offline manner from a machined surface measurement device (not illustrated) installed along with the machine tool 2. In addition, the non-volatile memory 14 stores data relating to detection values acquired in the offline manner or in the online manner via an interface 21 from various sensors 3 (acceleration sensor for detecting vibrations) attached to the machine tool 2. The data or the program stored in the non-volatile memory 14 may be loaded to the RAM 13 when in use. In addition, various algorithms required for analysis of time-series data and a system program for executing other required processes are written in the ROM 12 in advance.

An interface 23 connects each unit of the machining environment estimation device 1 and a machine learning device 300 to each other. The machine learning device 300 has a processor 301 which controls the overall machine learning device 300, a ROM 302 which stores a system program, a RAM 303 for storing temporary data in each process relating to machine learning, and a non-volatile memory 304 used for storing a learning model. The processor 301, the ROM 302, the RAM 303, and the non-volatile memory 304 are connected to one another via a bus 305. The machine learning device 300 can observe each piece of information which can be acquired by the machining environment estimation device 1 via the interface 23. In addition, the machining environment estimation device 1 performs a subsequent process, based on an estimation result of influence on a machining result exerted by a machining environment output from the machine learning device 300.

Figure 2:
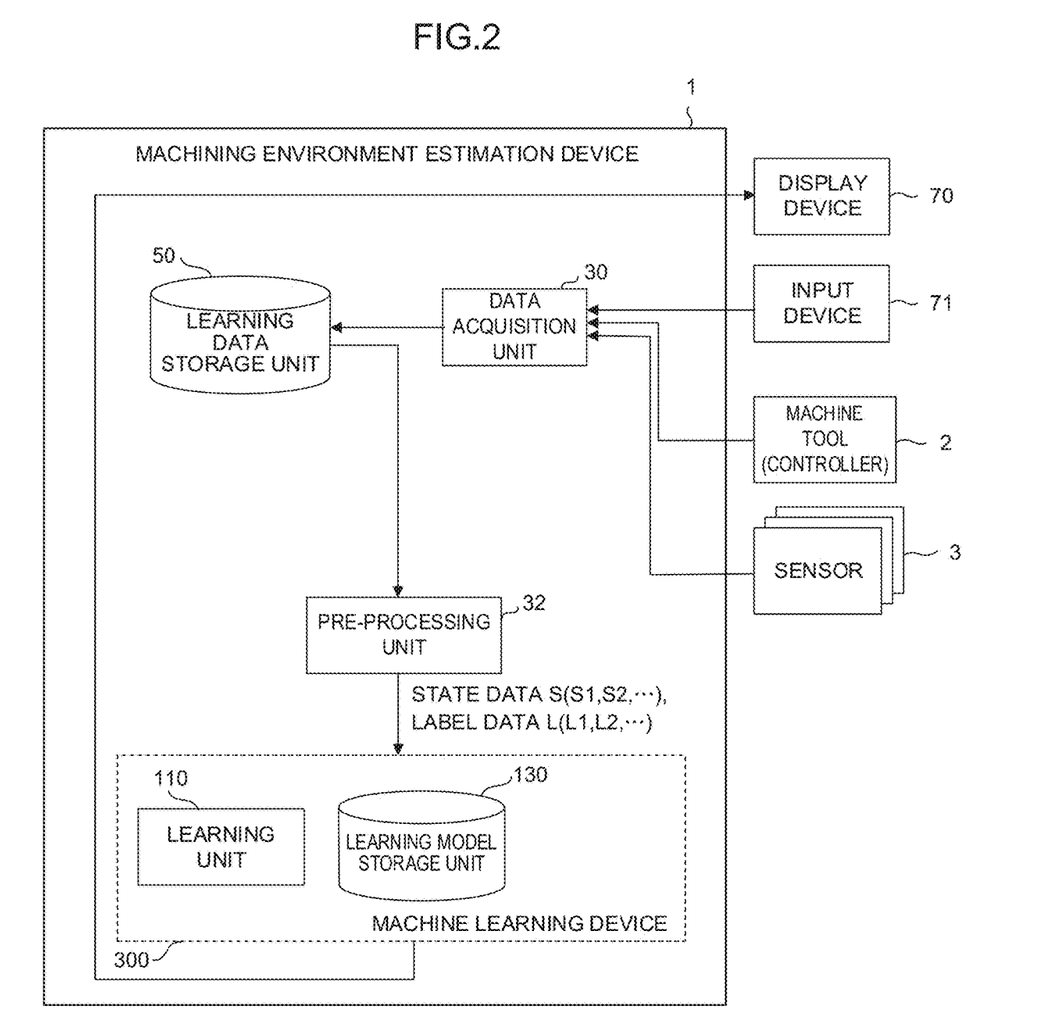
FIG. 2 is a schematic functional block diagram of a machining environment estimation device according to a first embodiment.

FIG. 2 is a schematic functional block diagram of the machining environment estimation device 1 according to a first embodiment. Each function of a functional block illustrated in FIG. 2 is realized in such a way that the CPU 11 of the machining environment estimation device 1 and the processor 301 of the machine learning device 300 execute each system program so as to control each unit of the machining environment estimation device 1 and the machine learning device 300.

The machining environment estimation device 1 according to the present embodiment includes a data acquisition unit 30 and a pre-processing unit 32. The machine learning device 300 included in the machining environment estimation device 1 includes a learning unit 110. The non-volatile memory 14 has a learning data storage unit 50 which stores data used for learning in the machine learning device 300. The non-volatile memory 304 of the machine learning device 300 has a learning model storage unit 130 which stores the learning model constructed by the machine learning in the learning unit 110.

The data acquisition unit 30 is a functional unit which causes the learning data storage unit 50 secured in the non-volatile memory 14 to store data acquired from the machine tool 2, the sensor 3, and the input device 71, as learning data.

Figure 3:
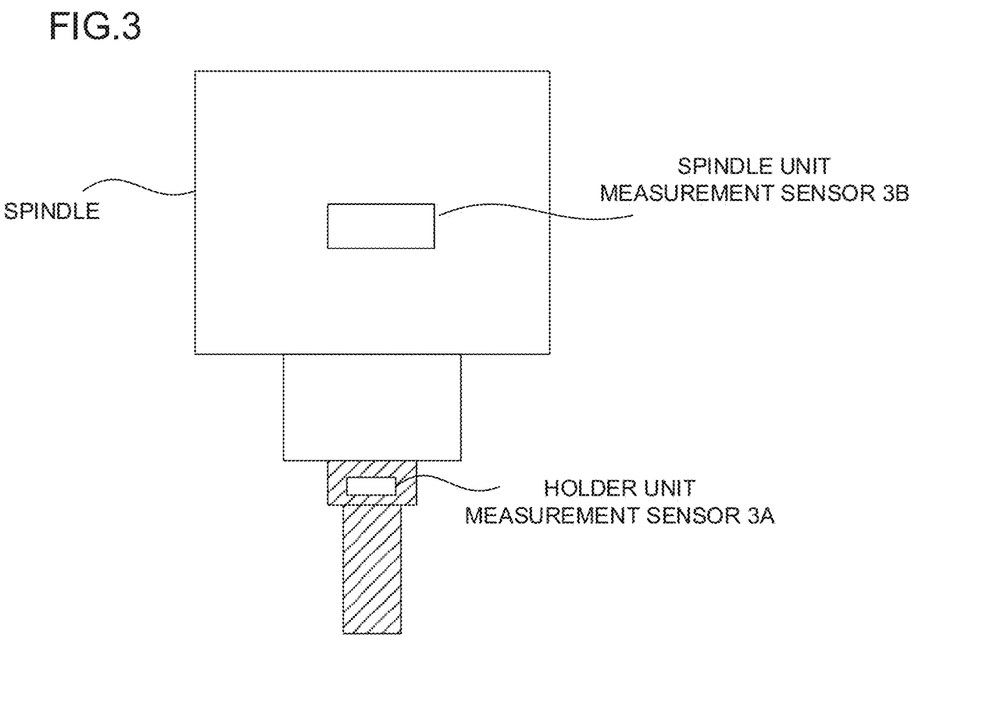
FIG. 3 is a view illustrating an example of a sensor used for vibration measurement.
Figure 4:
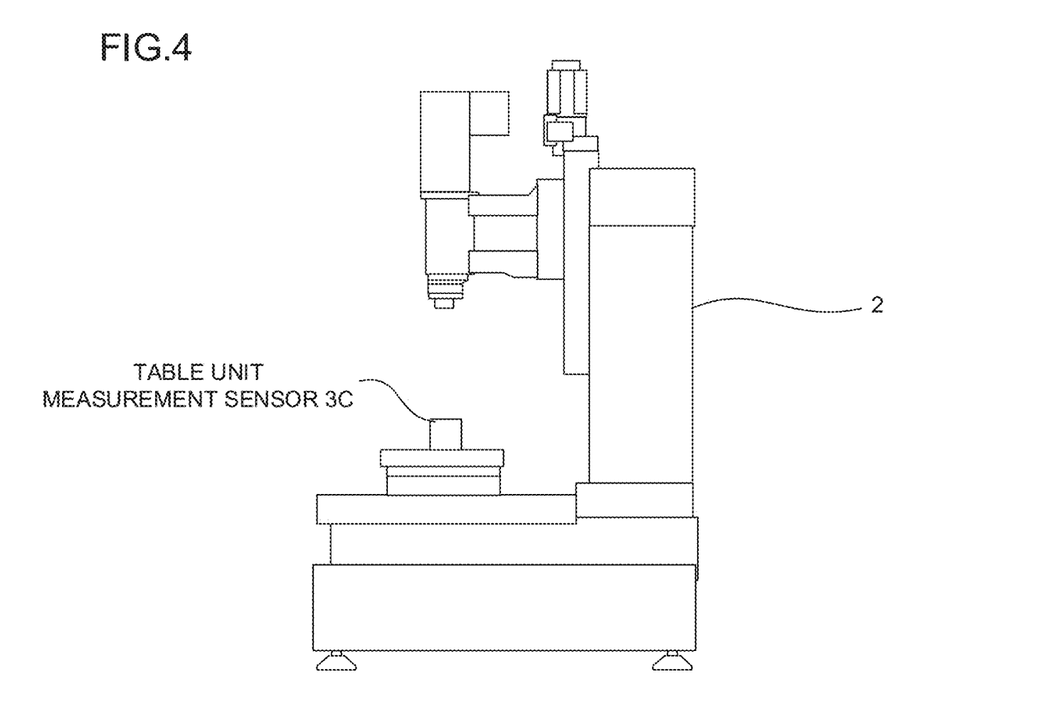
FIG. 4 is a view illustrating an example of a sensor used for vibration measurement.

The data acquisition unit 30 acquires time-series data of physical quantities measured by the sensor 3 installed in the machine tool 2. For example, the sensor 3 is an acceleration sensor for detecting the vibration. The sensor 3 is attached to each unit of the machine tool 2. The sensor 3 detects the vibration of an attached portion in the machine tool 2. As illustrated in FIGS. 3 and 4, the sensors 3 are respectively attached to a holder (holder unit measurement sensor 3A) attached to a spindle, the spindle (spindle unit measurement sensor 3B), and a table (table unit measurement sensor 3C). The holder unit measurement sensor 3A plays an important role in detecting the vibration transmitted to a tool when the machining is carried out. The holder unit measurement sensor 3A not only detects the vibration transmitted from the outside of the machine tool 2, but also detects a weak vibration generated in each unit (for example, a spindle motor or a fan internally attached to a control panel) inside the machine tool 2 and transmitted through the inside of a spindle rotation mechanism. In addition, the holder unit measurement sensor 3A can measure the vibration during the rotation of the spindle which varies depending on a tool to be used. The spindle unit measurement sensor 3B mainly measures a general vibration generated during the rotation of the spindle. The table unit measurement sensor 3C detects the general vibration transmitted to the table. For example, the data acquisition unit 30 generates time-series data by associating each acquired data with time data acquired from a real time clock (RTC) (not illustrated) incorporated in the machining environment estimation device 1. The data acquisition unit 30 causes the learning data storage unit 50 to store each generated time-series data. In a case where the time-series data is created in the machine tool 2, the data acquisition unit 30 may cause the learning data storage unit 50 to store the time-series data created in the machine tool 2 without any change. The time-series data that is stored in the learning data storage unit 50 by the data acquisition unit 30 may be a set of values (discrete values) associated with time. The time-series data stored in the learning data storage unit 50 by the data acquisition unit 30 may be an approximate expression (continuous value) obtained, based on the discrete values.

The data acquisition unit 30 acquires machining conditions such as the spindle rotation speed, the feedrate, and the number of blades when the machining is carried out for the workpiece, from the machine tool 2. The machining condition acquired by the data acquisition unit 30 is machining condition data when the machine tool 2 carries out the machining for the workpiece under an environment where the time-series data is detected by the sensor 3.

The data acquisition unit 30 acquires machined surface measurement data of the machining-finished workpiece measured by a machined surface measurement device (not illustrated). The machined surface measurement data acquired by the data acquisition unit 30 is machined surface measurement data of the machining-finished workpiece machined in accordance with the above-described machining condition under the environment where the time-series data is detected by the sensor 3.

The data acquisition unit 30 acquires evaluation data indicating a machined surface state of the machining-finished workpiece which is input from the input device 71. The machined surface evaluation data acquired by the data acquisition unit 30 indicates an evaluation result for the machined surface of the machining-finished workpiece machined in accordance with the above-described machining condition under the environment where the time-series data is detected by the sensor 3. For example, the machined surface evaluation data is binary data indicating whether the defect in the machined surface is present or absent.

The data acquisition unit 30 causes the learning data storage unit 50 to store the time-series data of the physical quantities (vibrations) measured by the above-described sensor 3, the machining conditions of the workpiece under the machining environment where the time-series data is measured, the machined surface measurement data of the machining-finished workpiece machined in accordance with the machining condition under the machining environment, and the evaluation data for the machined surface of the machining-finished workpiece machined in accordance with the machining condition under the machining environment, as a set of learning data.

The pre-processing unit 32 creates teacher data T including state data S and label data L which are used for learning by the machine learning device 300, based on the learning data stored in the learning data storage unit 50. The pre-processing unit 32 converts the learning data read from the learning data storage unit 50 into a format to be handled in the machine learning device 300 (numbering, normalizing, sampling, etc.), and creates the state data S and the label data L. The state data S created by the pre-processing unit 32 includes vibration data S1 indicating a vibration state under the machining environment of the machine tool 2 and machining condition data S2 indicating the machining condition when the machining is carried out by the machine tool 2. In addition, the label data L created by the pre-processing unit 32 includes at least machined surface measurement data L1 indicating a measurement result of the machined surface of the machining-finished workpiece and machined surface evaluation data L2 indicating an evaluation result of the machined surface of the machining-finished workpiece.

The vibration data S1 may be data indicating features of the vibration time-series data generated in each unit of the machine tool 2 which is acquired by the data acquisition unit 30. For example, the vibration data S1 represents an acceleration value (m/s$^2$), a speed value (mm/s), and a displacement value (μm) of a frequency component which are obtained by analyzing the vibration time-series data of the holder unit measured by the holder unit measurement sensor 3A using known spectral analysis. The vibration data S1 may be calculated, based on a predetermined number (for example, top 2 or top 10) of the frequency components counted from the largest amplitude out of the frequency components obtained by the spectral analysis. In addition, the vibration data S1 may further include the acceleration value (m/s$^2$), the speed value (mm/s), and the displacement value (μm) of the frequency component which are obtained by analyzing the vibration time-series data of the spindle unit measured by the spindle unit measurement sensor 3B using the known spectral analysis. The vibration data S1 may be calculated, based on the predetermined number (for example, top 2 or top 10) of the frequency components counted from the largest amplitude out of the frequency components obtained by analyzing the vibration time-series data measured by the spindle unit measurement sensor 3B. In addition, the vibration data S1 may include the acceleration value (m/s$^2$), the speed value (mm/s), and the displacement value (μm) of the frequency component which are obtained by analyzing the vibration time-series data of the table unit measured by the table unit measurement sensor 3C using the known spectral analysis. The vibration data S1 may be calculated, based on the predetermined number (for example, top 2 or top 10) of the frequency components counted from the largest amplitude out of the frequency components obtained by analyzing the vibration time-series data measured by the table unit measurement sensor 3C.

The machining condition data S2 is data indicating the machining condition such as the spindle rotation speed (rpm), the feedrate (mm/min), and the number of tool blades Z acquired from the machine tool 2 when the machining is carried out for the workpiece.

Figure 5:
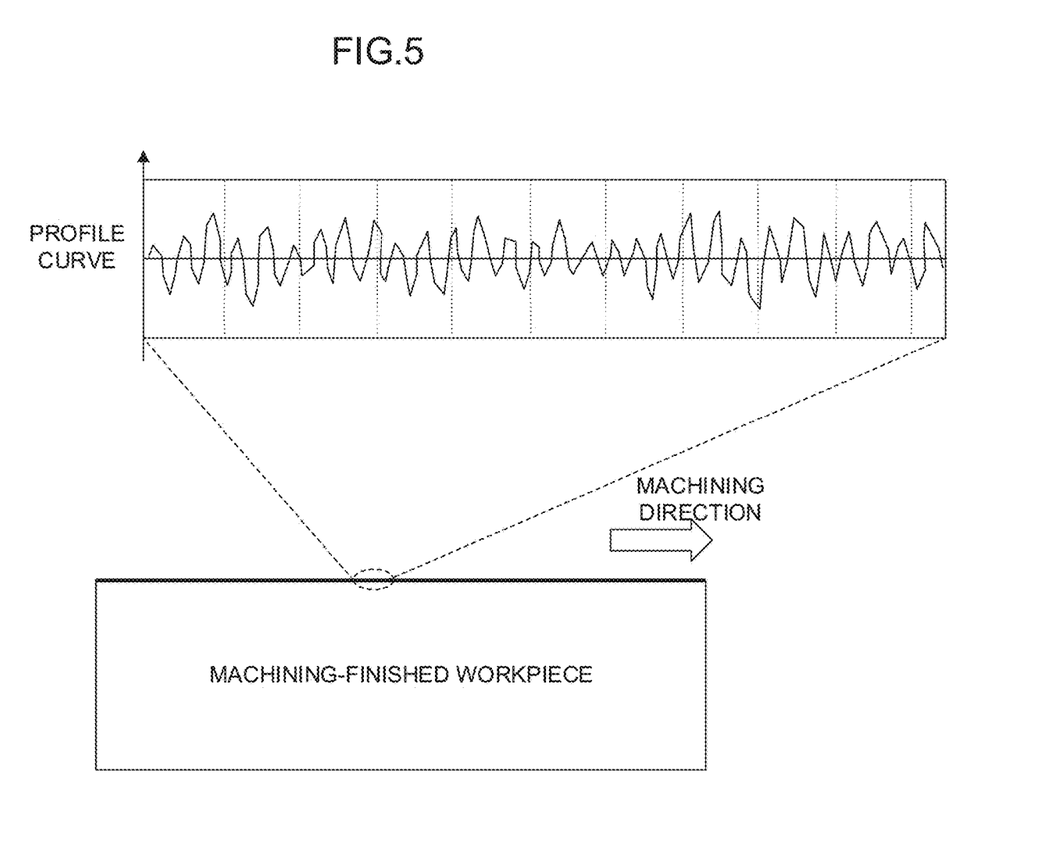
FIG. 5 is a view illustrating an example of a measurement result of a machined surface of a machining-finished workpiece.

For example, as illustrated in FIG. 5, the machined surface measurement data L1 is wavelength and amplitude data obtained by performing the spectral analysis on a profile curve along a machining direction (tool movement direction) of the machined surface of the machining-finished workpiece. The profile curve is obtained by the machined surface measurement device which measures the machined surface of the machining-finished workpiece.

For example, the machined surface evaluation data L2 is a numerical value of the machined surface evaluation result of the machining-finished workpiece (the defect in the machined surface is present=1 or the defect in the machined surface is absent=0). The machined surface evaluation result of the machining-finished workpiece is input through the input device 71 by a worker.

The learning unit 110 performs supervised learning using the state data S and the label data L which are created by the pre-processing unit 32. The learning unit 110 is a functional unit that generates (learns) a learned model by performing the supervised learning. The learned model is generated by learning the machined surface measurement data and the machined surface evaluation result of the machining-finished workpiece for the vibration state and the machining condition in the machining environment. For example, the learning unit 110 performs the supervised learning using a neural network as a learning model. In this case, as the learning model, the neural network including three layers such as an input layer, an intermediate layer, and an output layer is used. The learning unit 110 may perform deep learning using the neural network having four or more layers as the learning model. In this manner, effective learning and reasoning can be performed. The learned model generated by the learning unit 110 is stored in the learning model storage unit 130 on the non-volatile memory 304. The learned model is used for an estimation process of a state and evaluation of the machined surface of the workpiece which is performed by an estimation unit 120 to be described later.

The learning unit 110 repeatedly performs the above-described learning using the learning data when the machining is carried out for the workpiece machined in accordance with various machining conditions under various machining environments acquired by the data acquisition unit 30. The learning unit 110 generates the learned model used for estimating the state and the evaluation of the machined surface of the workpiece, based on the vibration state and the machining condition in the machining environment. The learning unit 110 repeatedly performs this learning. In this manner, the learning unit 110 constructs the learned model that has learned the state and the evaluation of the machined surface of the workpiece for the vibration state and the machining condition in the machining environment.

Figure 6:
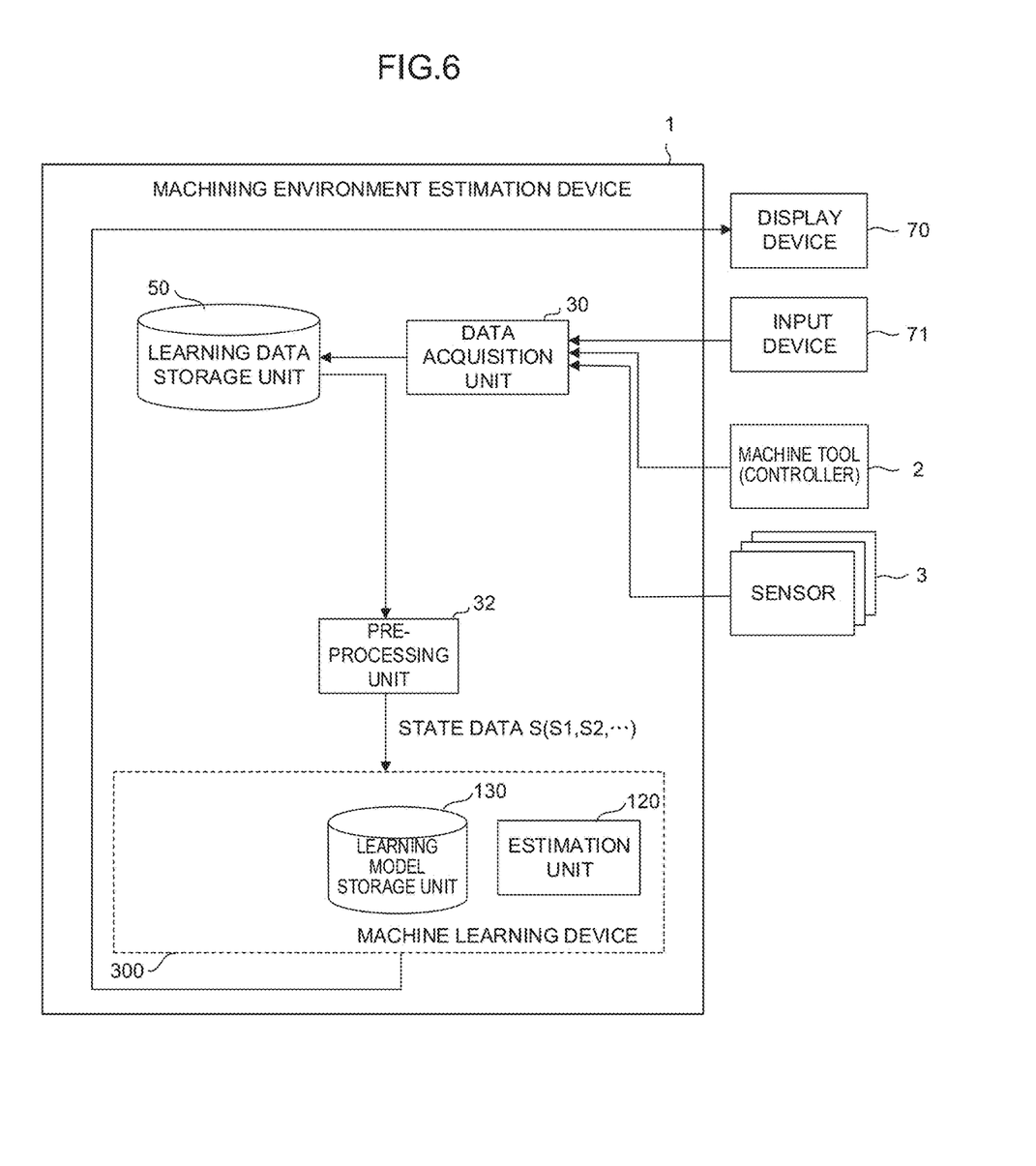
FIG. 6 is a schematic functional block diagram of a machining environment estimation device according to a second embodiment.

FIG. 6 is a schematic functional block diagram of the machining environment estimation device 1 according to a second embodiment. Each function of the functional block illustrated in FIG. 6 is realized in such a way that the CPU 11 of the machining environment estimation device 1 illustrated in FIG. 1 and the processor 301 of the machine learning device 300 execute each system program so as to control each unit of the machining environment estimation device 1 and the machine learning device 300.

The machining environment estimation device 1 according to the present embodiment uses the learned model stored in the learning model storage unit 130 so as to estimate the state and the evaluation of the machined surface of the workpiece. The machining environment estimation device 1 estimates the state and the evaluation of the machined surface of the workpiece, based on the vibration state and the machining condition in the machining environment which are acquired by the data acquisition unit 30.

The data acquisition unit 30 acquires only data needed to mainly generate the state data S from the machine tool 2 and the sensor 3. The data acquisition unit 30 causes the learning data storage unit 50 to store the acquired data. The learning data is acquired from the sensor 3, for example, when the machine tool performs a predetermined measurement operation (benchmark operation) before the machining starts. In addition, the learning data relating to the machining condition may be acquired by the data acquisition unit 30 from a machining program used for the machining, for example, before the machining starts.

In addition, the pre-processing unit 32 generates the vibration data S1 and the machining condition data S2 as the state data S used for the estimation in the machine learning device 300, based on the learning data stored in the learning data storage unit 50.

The estimation unit 120 estimates the state and the evaluation of the machined surface of the workpiece by using the learned model, based on the state data S input from the pre-processing unit 32. The estimation unit 120 according to the present embodiment estimates the state and the evaluation of the machined surface of the workpiece by using the learned model generated (whose parameter is determined) through the supervised learning by the learning unit 110. The estimation unit 120 uses the state data S (vibration state and machining condition under the machining environment) input from the pre-processing unit 32, as input data, thereby estimating (calculating) the state and the evaluation of the machined surface of the workpiece. The state and the evaluation of the machined surface of the workpiece which are estimated by the estimation unit 120 are output to the display device 70, for example. In addition, the state and the evaluation of the machined surface of the workpiece which are estimated by the estimation unit 120 may be used after being output to a host computer or a cloud computer via a wired/wireless network (not illustrated). Other information may be further displayed in addition to the wavelength and the amplitude which indicate a state of the machined surface of the workpiece. For example, the machining condition data S2 such as the spindle rotation speed, the feedrate, and the number of blades which are included in the state data S may be used so as to calculate and display the frequency serving as a cause of the defect in the machined surface, based on wavelength of the wave (fold) appearing on the machined surface. For example, in a case of spring neck machining in which the spindle is not rotated, the frequency which causes the defect in the machined surface can be calculated by dividing the feedrate by the wavelength of the wave appearing on the machined surface. In addition, in a case where the spindle is rotated at a constant speed, the frequency caused by the rotation of the spindle which is calculated from the spindle rotation speed and the number of blades and the frequency obtained by dividing the feedrate by the wavelength of the wave appearing on the machined surface are added to each other or subtracted from each other. In this manner, it is possible to calculate the frequency of the disturbance vibration.

In the machining environment estimation device 1 according to the present embodiment configured as described above, the learning is performed, based on a plurality of teacher data items obtained under various machining environments and machining conditions. The state and the evaluation of the machined surface of the workpiece can be estimated using the learned model obtained as a result of the learning. Under a current machining environment, a worker who views the estimation result obtained by the machining environment estimation device 1 can instantly recognize whether or not the defect in the machined surface occurs in a case where the machining is carried out under the machining condition designated by a machining program. In addition, the worker can also recognize the estimation result of the wavelength and the amplitude of the wave (fold) appearing on the machined surface. Therefore, if the worker is experienced, the worker can predict and deal with a cause of worsening the machining environment, based on a value of the wavelength. Furthermore, the frequency component which causes the above-described defect in the machined surface is concurrently displayed. In this manner, even if the worker is less experienced, the worker can predict and deal with the cause of worsening the machining environment.

Figure 7:
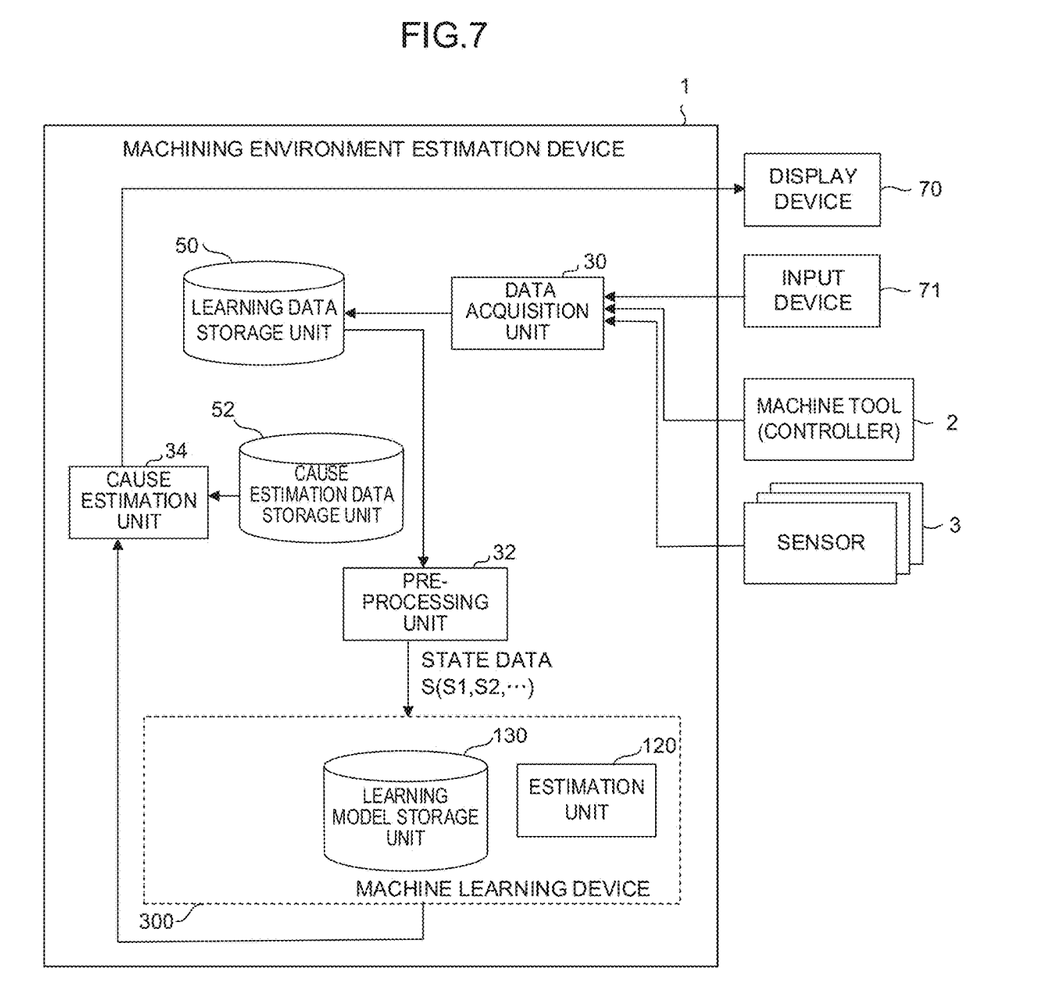
FIG. 7 is a schematic functional block diagram of a machining environment estimation device according to a third embodiment.

FIG. 7 is a schematic functional block diagram of the machining environment estimation device 1 according to a third embodiment. Each function of the functional block illustrated in FIG. 7 is realized in such a way that the CPU 11 of the machining environment estimation device 1 illustrated in FIG. 1 and the processor 301 of the machine learning device 300 execute each system program so as to control each unit of the machining environment estimation device 1 and the machine learning device 300.

The machining environment estimation device 1 according to the present embodiment further includes a cause estimation unit 34 in addition to the respective functional units described in the second embodiment. In addition, a cause estimation data storage unit 52 which stores cause estimation data associated with guidance relating to a cause of the vibration detected in advance by each unit is secured on the non-volatile memory 14.

Figure 8:
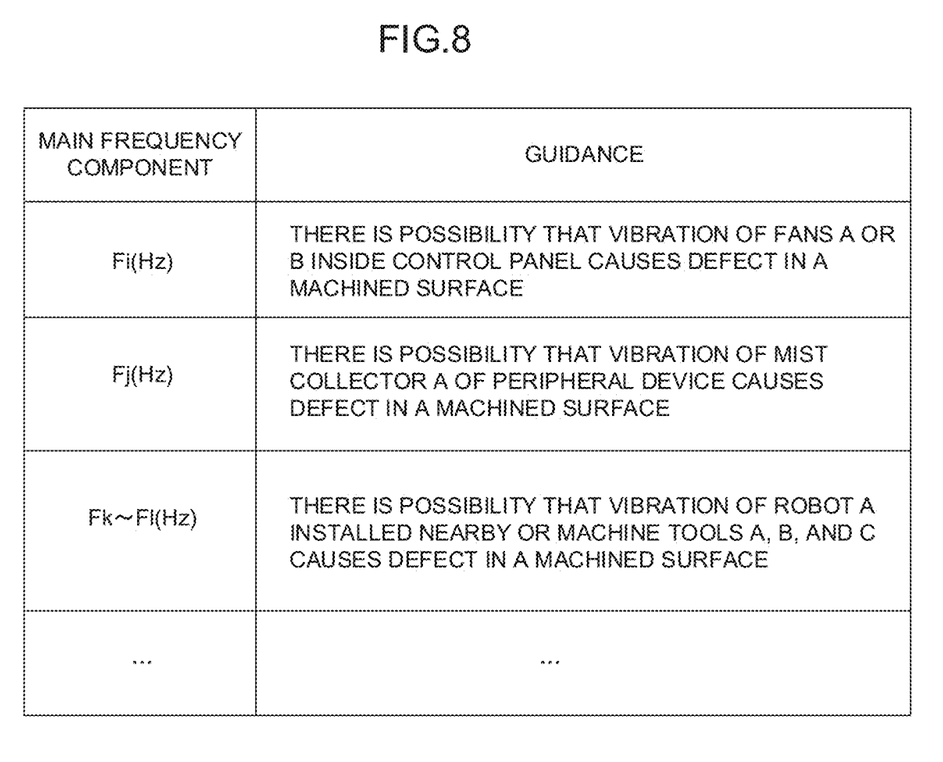
FIG. 8 is a view illustrating an example of cause estimation data.

The cause estimation unit 34 is a functional unit that causes the display device 70 to display the guidance relating to the cause of the defect in the machined surface, based on an estimation result of the state and the evaluation of the machined surface of the workpiece which is obtained by the machine learning device 300. The cause estimation unit 34 refers to the cause estimation data stored in the cause estimation data storage unit 52, when the guidance relating to the cause of the defect in the machined surface is displayed. For example, as illustrated in FIG. 8, the cause estimation data is data associated with the guidance indicating a matter estimated to be the cause of the vibration for a range of the frequency component calculated based on the wavelength of the wave (fold) appearing on the machined surface and the machining condition. The cause estimation unit 34 calculates the frequency which causes the defect in the machined surface, based on the estimation result of the state and the evaluation of the machined surface of the workpiece which is obtained by the machine learning device 300, the state data S such as the spindle rotation speed, the feedrate, and the number of blades which are used for the estimation, and the wavelength of the wave (fold) appearing on the machined surface. The cause estimation unit 34 compares the frequency which causes the defect in the machined surface with the cause estimation data stored in the cause estimation data storage unit 52, and reads the guidance corresponding thereto. The cause estimation unit 34 causes the display device 70 to display the guidance together with the estimation result obtained by the machine learning device 300.

The cause estimation data stored in the cause estimation data storage unit 52 is created, based on the main frequency component of the vibration when a problem is made to intentionally arise in advance in a portion which causes the vibration. For example, the cause estimation data is created, based on the following. A fan A or a fan B inside a control panel is replaced with the aged one, and the aged one is operated. Thereafter, the machining is carried out in accordance with a predetermined machining condition. In this manner, the cause estimation data is created, based on the waves appearing on the machined surface of the machining-finished workpiece. This machining (experiment) is repeatedly carried out, thereby preparing the cause estimation data. The cause estimation data is stored in advance in the cause estimation data storage unit 52, and is used for estimating the cause of the defect in the machined surface in the cause estimation unit 34.

Hitherto, the embodiments according to the present disclosure have been described. However, without being limited only to the examples of the above-described embodiments, the present disclosure can be executed in various aspects by appropriately adding modifications thereto.

The invention claimed is:

1. A system configured to estimate influence exerted by vibrations on machining in a machine tool, the system comprising:
 a controller controlling the machine tool;
 a central processing unit (CPU) configured to:
  acquire data including:
   vibration time-series data of a holder attached to a spindle of the machine tool,
   vibration time-series data of the spindle in the machine tool,
   vibration time-series data of a table in the machine tool that indicate a machining environment of the machine tool,
   machining conditions in carrying out machining for a workpiece in the machine tool,
   measurement data of a machined surface of a machining-finished workpiece, and
   evaluation data of the machined surface,
  create vibration data and machining condition data which serve as state data, and machined surface measurement data and machined surface evaluation data which serve as label data, based on the acquired data; and
 a processor configured to:
  generate a learning model of a neural network in which the machined surface measurement data and a machined surface evaluation result of the machining-finished workpiece are learned, for a vibration state and the machining conditions in the machining environment, using the state data and the label data, and
  estimate a state and an evaluation of the machined surface of the machining-finished workpiece, using the learning model subsequent to learning.

* * * * *